(12) United States Patent
Maeshima et al.

(10) Patent No.: US 11,872,820 B2
(45) Date of Patent: Jan. 16, 2024

(54) LIQUID LEAKAGE DETECTION DEVICE INCLUDING TWO ABSORPTION LAYERS AND PAIR OF TERMINALS, AND INK JET RECORDING APPARATUS

(71) Applicant: KYOCERA Document Solutions Inc., Osaka (JP)

(72) Inventors: Masanobu Maeshima, Osaka (JP); Yasuyuki Fukunaga, Osaka (JP); Kuniaki Araishi, Osaka (JP); Noriaki Furukawa, Osaka (JP); Haruki Sayama, Osaka (JP)

(73) Assignee: KYOCERA Document Solutions Inc., Osaka (JP)

( * ) Notice: Subject to any disclaimer, the term of this patent is extended or adjusted under 35 U.S.C. 154(b) by 136 days.

(21) Appl. No.: 17/681,624

(22) Filed: Feb. 25, 2022

(65) Prior Publication Data
US 2022/0274408 A1     Sep. 1, 2022

(30) Foreign Application Priority Data
Feb. 26, 2021  (JP) ................................. 2021-029956

(51) Int. Cl.
*B41J 2/17*  (2006.01)
*B41J 2/165*  (2006.01)
*G01M 3/18*  (2006.01)
*B41J 2/175*  (2006.01)

(52) U.S. Cl.
CPC ......... *B41J 2/16579* (2013.01); *B41J 2/1721* (2013.01); *G01M 3/186* (2013.01); *B41J 2/17596* (2013.01)

(58) Field of Classification Search
CPC ...................................... B41J 2/1721
See application file for complete search history.

(56) References Cited

U.S. PATENT DOCUMENTS

| 5,953,031 A | * | 9/1999 | Omata | B41J 2/1752 347/86 |
| 6,227,642 B1 | * | 5/2001 | Hanabusa | B41J 2/1721 347/19 |
| 2018/0229506 A1 | * | 8/2018 | Yamagishi | B41J 2/1721 |

FOREIGN PATENT DOCUMENTS

| JP | H06-340089 A | 12/1994 |
| JP | 3658367 B2 * | 6/2005 |
| JP | 2006-231803 A | 9/2006 |

* cited by examiner

*Primary Examiner* — Sharon Polk
(74) *Attorney, Agent, or Firm* — IP BUSINESS SOLUTIONS, LLC

(57) ABSTRACT

A liquid leakage detection device includes a first absorption layer, a second absorption layer, and a pair of terminals. The first absorption layer absorbs liquid. The second absorption layer is stacked on the first absorption layer, and absorbs the liquid. The pair of terminals are in contact only with the second absorption layer.

10 Claims, 10 Drawing Sheets

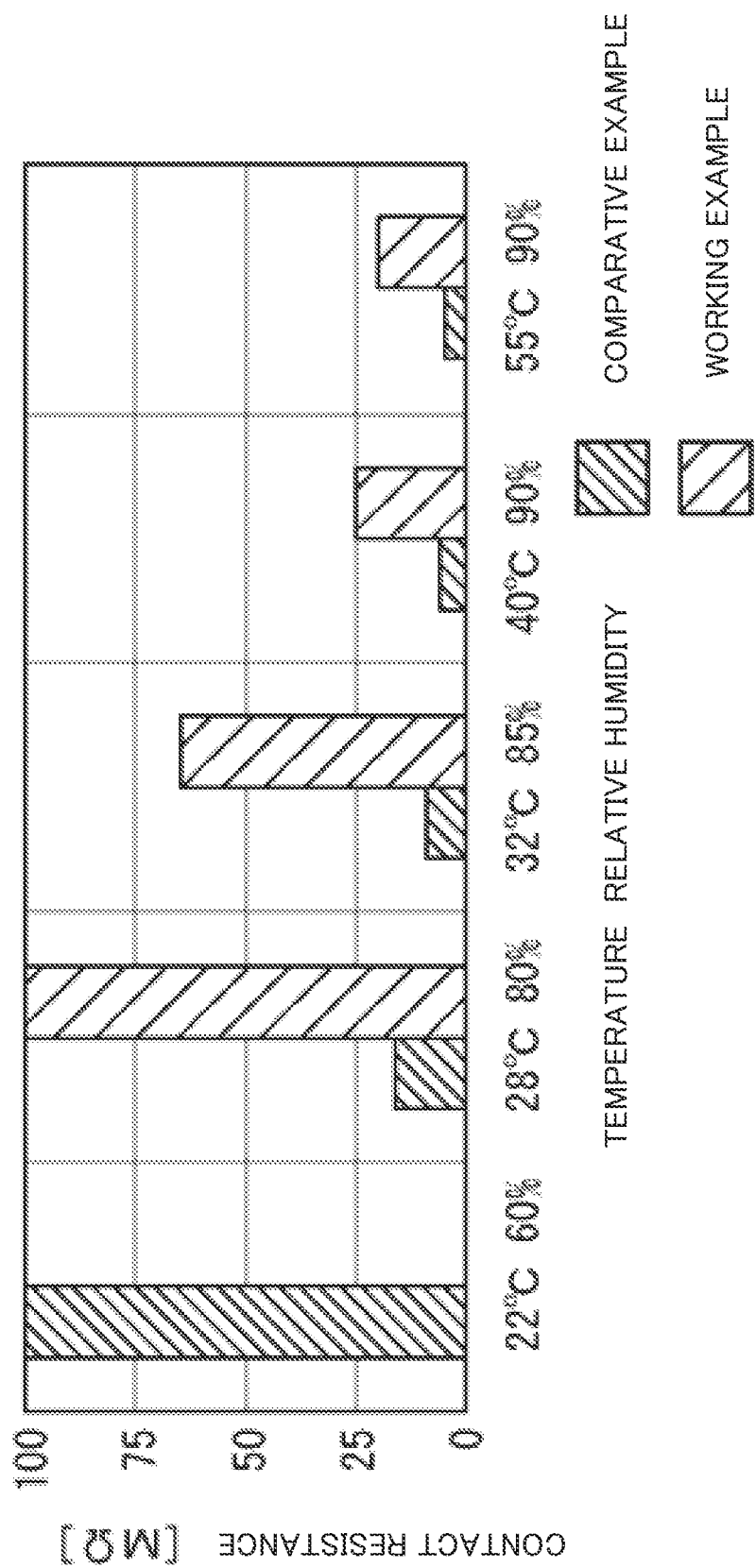

LIQUID LEAKAGE DETECTION DEVICE INCLUDING TWO ABSORPTION LAYERS AND PAIR OF TERMINALS, AND INK JET RECORDING APPARATUS

INCORPORATION BY REFERENCE

This application claims priority to Japanese Patent Application No. 2021-029956 filed on Feb. 26, 2021, the entire contents of which are incorporated by reference herein.

BACKGROUND

The present disclosure relates to a liquid leakage detection device that detects liquid leakage, and an ink jet recording apparatus that includes the liquid leakage detection device.

The ink jet recording apparatus includes an ink container, a pump, a sub tank, an ink jet head, a cleaning solution tank, and a waste liquid tank, which are connected via pipes. In case a liquid, such as ink, cleaning solution, or waste liquid leaks inside such a recording apparatus, the components constituting the apparatus or recording sheets may be contaminated, and electric circuits may cause a short circuit. Accordingly, some techniques to detect the liquid leakage inside the apparatus have been developed. For example, a technique to detect the ink absorbed by a sheet-form absorbing body with a sensor, and a technique to detect shape transition of a solid object molten by the ink, are known.

SUMMARY

The disclosure proposes further improvement of the foregoing technique.

In an aspect, the disclosure provides a liquid leakage detection device including a first absorption layer, a second absorption layer, and a pair of terminals. The first absorption layer absorbs liquid. The second absorption layer is stacked on the first absorption layer, and absorbs the liquid. The pair of terminals are in contact only with the second absorption layer.

In another aspect, the disclosure provides an ink jet recording apparatus including the foregoing liquid leakage detection device, and an ink jet head. The ink jet head ejects ink onto a sheet.

BRIEF DESCRIPTION OF THE DRAWINGS

FIG. 10 is a graph showing experimental results of contact resistance.

DETAILED DESCRIPTION

Hereafter, a printer 1 according to an embodiment of the disclosure, and exemplifying the ink jet recording apparatus of the disclosure, will be described with reference to the drawings.

Figure 1:
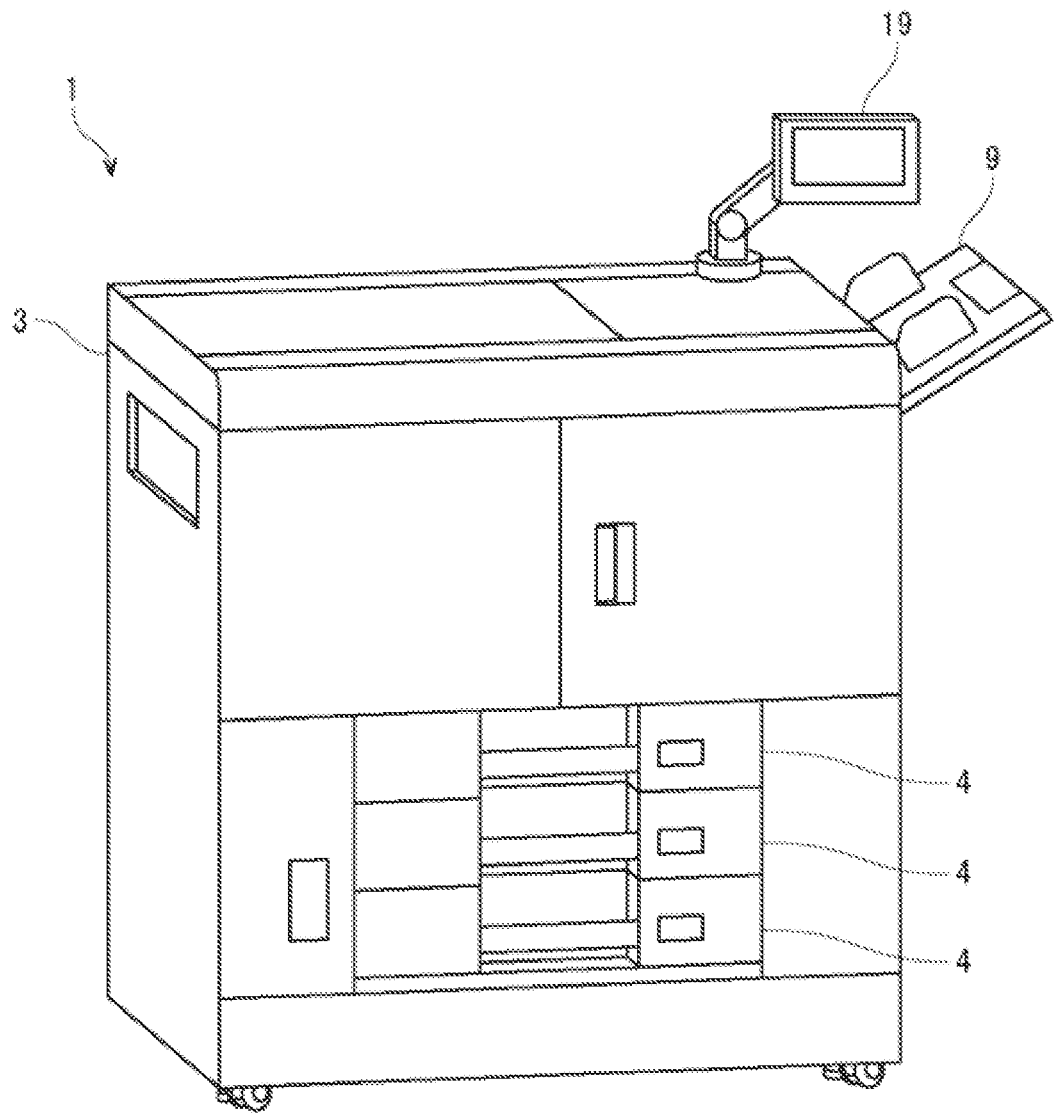
FIG. 1 is a perspective view showing the appearance of a printer.
Figure 1:
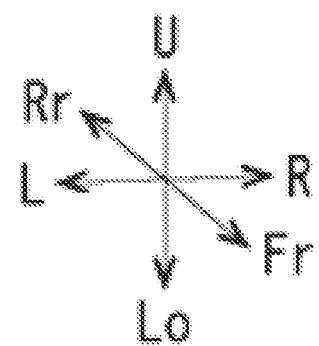
Figure 2:
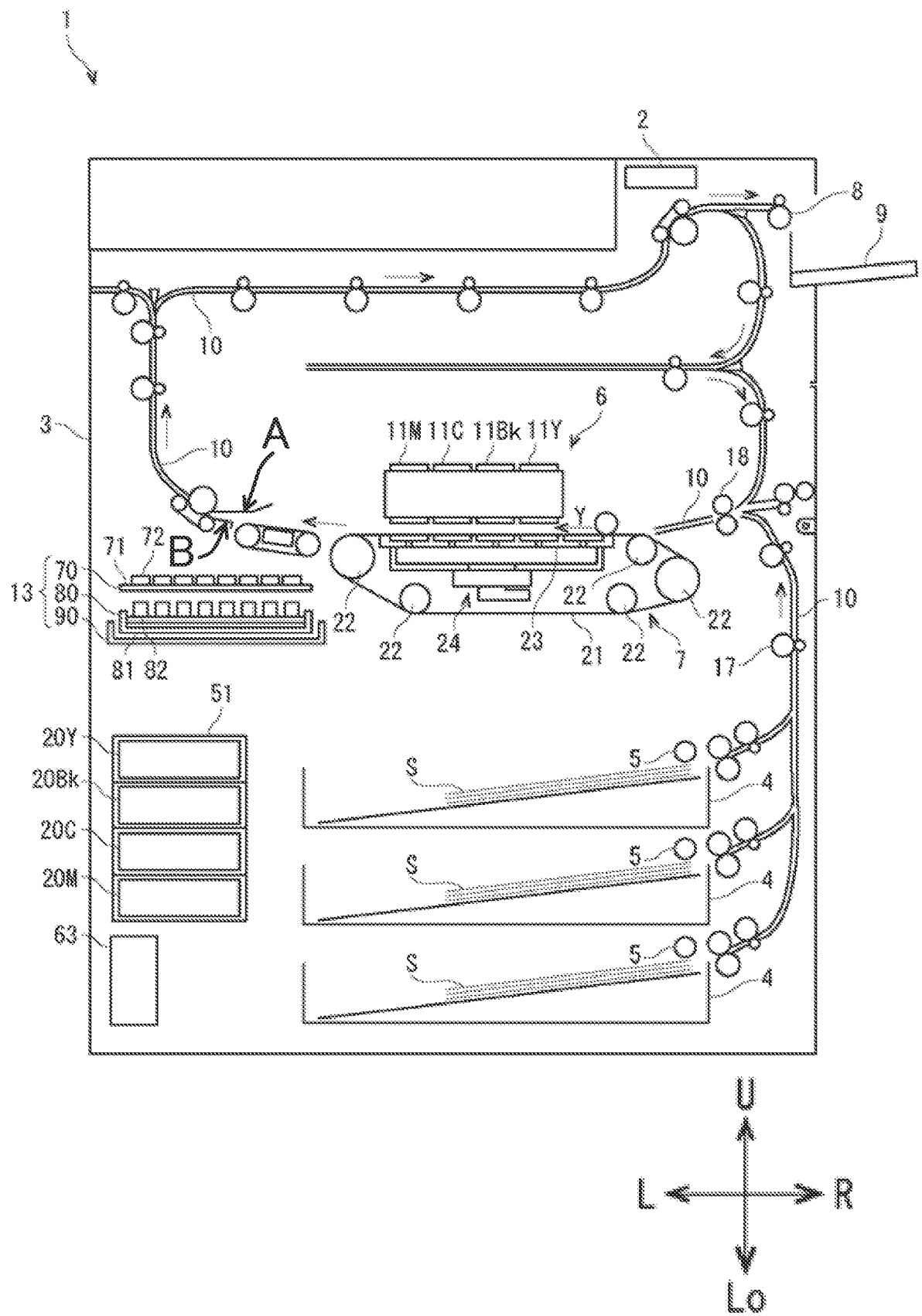
FIG. 2 is a front view of the printer, schematically showing an internal configuration thereof.
Figure 3:
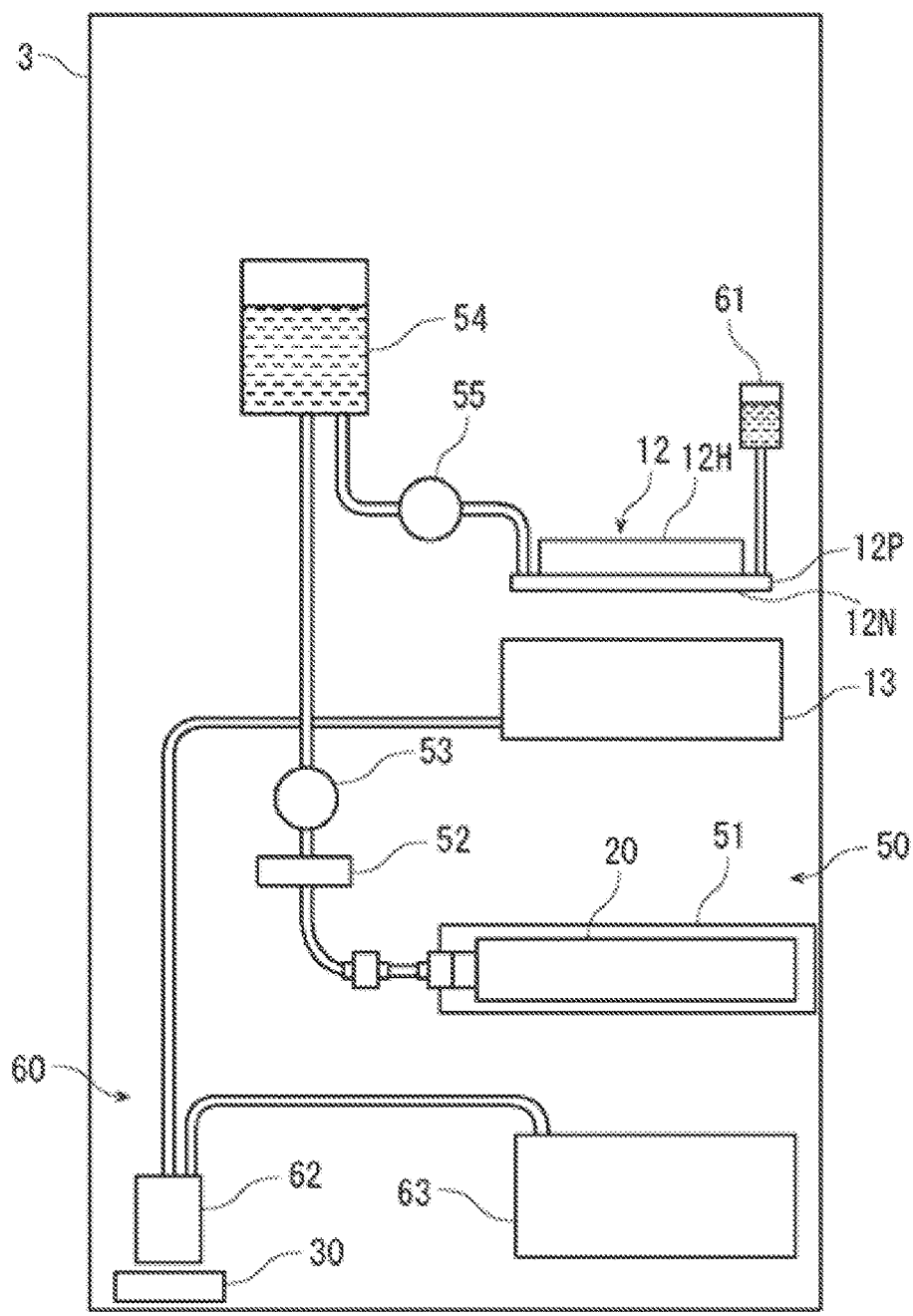
FIG. 3 is a schematic diagram showing an ink supply mechanism and a waste liquid collection mechanism of the printer.
Figure 3:
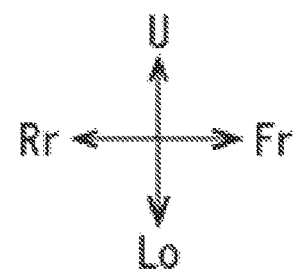

To start with, the general configuration of the printer 1 will be described. FIG. 1 is a perspective view showing the appearance of the printer 1. FIG. 2 is a front view schematically showing an internal configuration of the printer 1. FIG. 3 is a schematic diagram showing an ink supply mechanism 50 and a waste liquid collection mechanism 60 of the printer 1. Hereinafter, the near side of the sheet face of FIG. 2 will be defined as front side of the image forming system 100, and the left and right directions will be defined with reference to the image forming system 100 viewed from the front side. In each of the drawings, the codes U, Lo, L, R, Fr, and Rr respectively indicate upper side, lower side, left side, right side, front side, and rear side.

The printer 1 includes a housing 3 of a rectangular parallelepiped shape (see FIG. 2). In the lower region of the housing 3, a plurality of paper cassettes 4 for storing sheet-form recording medium (hereinafter, sheet 5) such as a plain paper or coated paper, and feed rollers 5 that feed the sheet S from the paper cassette 4, are provided. Above the paper cassettes 4, a transport device 7 that adsorbs the sheet S, and transports the sheet S in a Y-direction is provided. On the upper side of the transport device 7, an image forming unit 6 that ejects ink onto the sheet S is provided. In the upper right region of the housing 3, a delivery roller pair 8 that delivers the sheet S having an image formed thereon, and an output tray 9 for receiving the delivered sheet S, are provided.

Inside the housing 3, a transport route 10 is provided, from the paper cassette 4 as far as the output tray 9, through the gap between the transport device 7 and the image forming unit 6. The transport route 10 includes plate-shaped members opposed to each other, with a gap therebetween for the sheet S to pass through. A transport roller pair 17 that pinches the sheet S therebetween and transports the same, is provided at a plurality of positions along the transport direction Y, on the transport route 10. A resist roller pair 18 is provided upstream of the image forming unit 6, in the transport direction.

The transport device 7 includes an endless transport belt 21 having a multitude of ventilation holes and spanned over a plurality of rollers 22, a supporting plate 23 having a multitude of ventilation holes, and the upper surface of which is in contact with the inner surface of the transport belt 21, and a suction device 24 that sucks air through the ventilation holes of the supporting plate 23, thereby allowing the transport belt 21 to adsorb the sheet S. When one of the plurality of rollers 22 is driven, for example by a motor, the transport belt 21 is made to rotate counterclockwise, so that the sheet S adsorbed to the transport belt 21 is transported in the Y-direction.

The image forming unit 6 includes head units 11Y, 11Bk, 11C, and 11M (may be collectively referred to as "head unit 11", where appropriate), which eject yellow, black, cyan, and magenta ink, respectively. Ink containers 20Y, 20Bk, 20C, and 20M (may be collectively referred to as "ink container 20", where appropriate), respectively loaded with the yellow, black, cyan, and magenta ink, are connected to the head units 11Y, 11Bk, 11C, and 11M, respectively. The ink container 20 is mounted on a container mounting base 51, located on the left of the paper cassettes 4.

The head unit 11 includes one or more ink jet heads 12, for example a plurality of ink jet heads 12 arranged in a checkerboard pattern (see FIG. 3). The ink jet head 12 includes a casing 12H of a rectangular parallelepiped shape elongate in the front-rear direction, and a nozzle plate 12P provided on the bottom face of the casing 12H. The nozzle plate 12P includes a multitude of nozzles aligned in the front-rear direction, and the ejection port of each nozzle is provided in a nozzle surface 12N, corresponding to the lower surface of the nozzle plate 12P The nozzles each include a piezoelectric element, and a drive circuit that drives the piezoelectric element is provided inside the casing 12H.

The printer 1 includes an ink supply mechanism 50 that supplies the ink to the ink jet head 12 (see FIG. 3). FIG. 3 illustrates the ink supply mechanism 50 corresponding to one of the ink jet heads 12. The ink supply mechanism 50 includes the ink container 20, a filter 52 that filtrates the ink, a pump 53 that sucks the ink from the ink container 20 through the filter 52, a sub tank 54 for storing the ink delivered from the pump 53, and a pump 55 that supplies the ink stored in the sub tank 54 to the ink jet head 12. A cleaning solution tank 61 for storing a cleaning solution is connected to the ink jet head 12.

A control device 2 (see FIG. 2) including a computing unit and a storage unit is also provided in the housing 3. The computing unit is, for example, a central processing unit (CPU). The storage unit includes storage media such as a read-only memory (ROM), a random-access memory (RAM), and an electrically erasable programmable read-only memory (EEPROM). The computing unit carries out various processings, by retrieving and executing control programs stored in the storage unit. Here, the control device 2 may be realized by an integrated circuit that does not depend on software.

An operation panel 19 is provided at a right rear position on the top face of the housing 3 (see FIG. 1). The operation panel 19 includes a display panel, a touch panel overlaid on the screen of the display panel, and a keypad located adjacent to the display panel. The control device 2 displays a screen showing the operation menu of the printer 1 on the display panel, and controls the components of the printer 1, according to an input detected through the touch panel or keypad.

The basic operation of the printer 1 is performed as follows. When an image forming job is inputted to the printer 1, for example from an external computer, the feed roller 5 delivers the sheet S from the paper cassette 4 to the transport route 10, and the resist roller pair 18 in a stopped state corrects the skew of the sheet S. When the resist roller pair 18 delivers the sheet S to the transport device 7 at a predetermined timing, the transport device 7 adsorbs the sheet S to the transport belt 21, and transports the sheet S in the Y-direction. Then the control device 2 supplies gradation data for each of the nozzles of the ink jet head 12 to the drive circuit, in synchronization with the transport of the sheet S, and the drive circuit supplies drive signals representing the gradation data to the piezoelectric element, so that an ink droplet is ejected from each nozzle, and an image is formed on the sheet S. The delivery roller pair 8 delivers the sheet S, now having the image formed thereon, to the output tray 9.

[Treatment Unit]

A treatment unit 13 (see FIG. 2) includes a cap unit 70 that covers the nozzle surface 12N of the ink jet head 12, and a wipe unit 80 that cleans the nozzle surface 12N. The cap unit 70 includes a supporting plate 71, and a plurality of caps 72 made of a resin and provided on the upper face of the supporting plate 71. One cap 72 is provided for each of the ink jet heads 12. The wipe unit 80 includes a supporting plate 81, a wipe blade 82 made of a resin and provided on the upper side of the supporting plate 81, and a wipe mechanism that drives the wipe blade 82. The wipe mechanism cleans the nozzle surface 12N, by causing the wipe blade 82 brought into contact with the nozzle surface 12N to slide in the front-rear direction. The supporting plate 81 also serves as a receptacle for receiving waste liquid produced as result of the cleaning of the nozzle surface 12N.

The wipe unit 80 is located under the cap unit 70. The cap unit 70 and the wipe unit 80 are supported by a carriage 90, so as to be elevated or descended with respect to the carriage 90. The carriage 90 is supported by the housing 3, via a carriage slide mechanism. The carriage slide mechanism causes the carriage 90 to slide in the left-right direction, with respect to the housing 3. The cap unit 70 is supported by the carriage 90, via a cap unit slide mechanism. The cap unit slide mechanism causes the cap unit 70 to slide in the left-right direction, with respect to the carriage 90. The transport device 7 is supported by the housing 3, via an elevation mechanism. The elevation mechanism elevates and descends the transport device 7, with respect to the housing 3.

FIG. 2 illustrates the state where the image forming operation is being performed. In FIG. 2, the upper face of the transport belt 21 is spaced downward from the nozzle surface 12N of the ink jet head 12, by approximately 1 mm, and the treatment unit 13 is located at a retracted position on the left of the transport device 7.

The control device 2 operates as follows, at a predetermined timing. First, the control device 2 causes the elevation mechanism to descend the transport device 7, and causes the carriage slide mechanism to slide the carriage 90 to a position between the transport device 7 and the image forming unit 6. Then the control device 2 causes the cap unit slide mechanism to slide the cap unit 70 to the retracted position, and causes the elevation mechanism to elevate the transport device 7, to thereby lift up the wipe unit 80. The control device 2 then forcibly causes the ink jet head 12 to eject the ink having increased viscosity (purging).

Thereafter, the control device 2 causes the wipe mechanism to slide the wipe blade 82 in the front-rear direction, to clean the nozzle surface 12N. At this point, the cleaning solution is supplied from the cleaning solution tank 61 to the nozzle surface 12N, so that the ink remaining on the nozzle surface 12N is diluted. The wipe blade 82 scrapes off the waste liquid, which is a mixture of the cleaning solution and the ink, and drops the waste liquid onto the supporting plate 81.

The control device 2 then causes the elevation mechanism to descend the transport device 7, causes the cap unit slide mechanism to slide the cap unit 70 to the position on the upper side of the wipe unit 80, and causes the elevation mechanism to elevate the transport device 7, so as to lift up the cap unit 70 via the wipe unit 80. Through the mentioned operation, the nozzle surface 12N is covered with the cap 72, so that clogging of the ejection port can be prevented.

[Waste Liquid Collection Mechanism]

The printer 1 includes a waste liquid collection mechanism 60 for collecting the waste liquid produced as result of the cleaning of the nozzle surface 12N of the ink jet head 12 (see FIG. 3). A waste liquid pump 62 and a waste liquid tank 63 are connected to the treatment unit 13. The waste liquid pump 62 is located at a rear position in a lower left region of the housing 3. The waste liquid tank 63 is located on the front side with respect to the waste liquid pump 62. The waste liquid pump 62 is, for example, a tube pump. The waste liquid pump 62 sucks the waste liquid accumulated in the supporting plate 81 of the wipe unit 80, and transports the waste liquid to the waste liquid tank 63.

[Liquid Leakage Detection Device]

Figure 4:
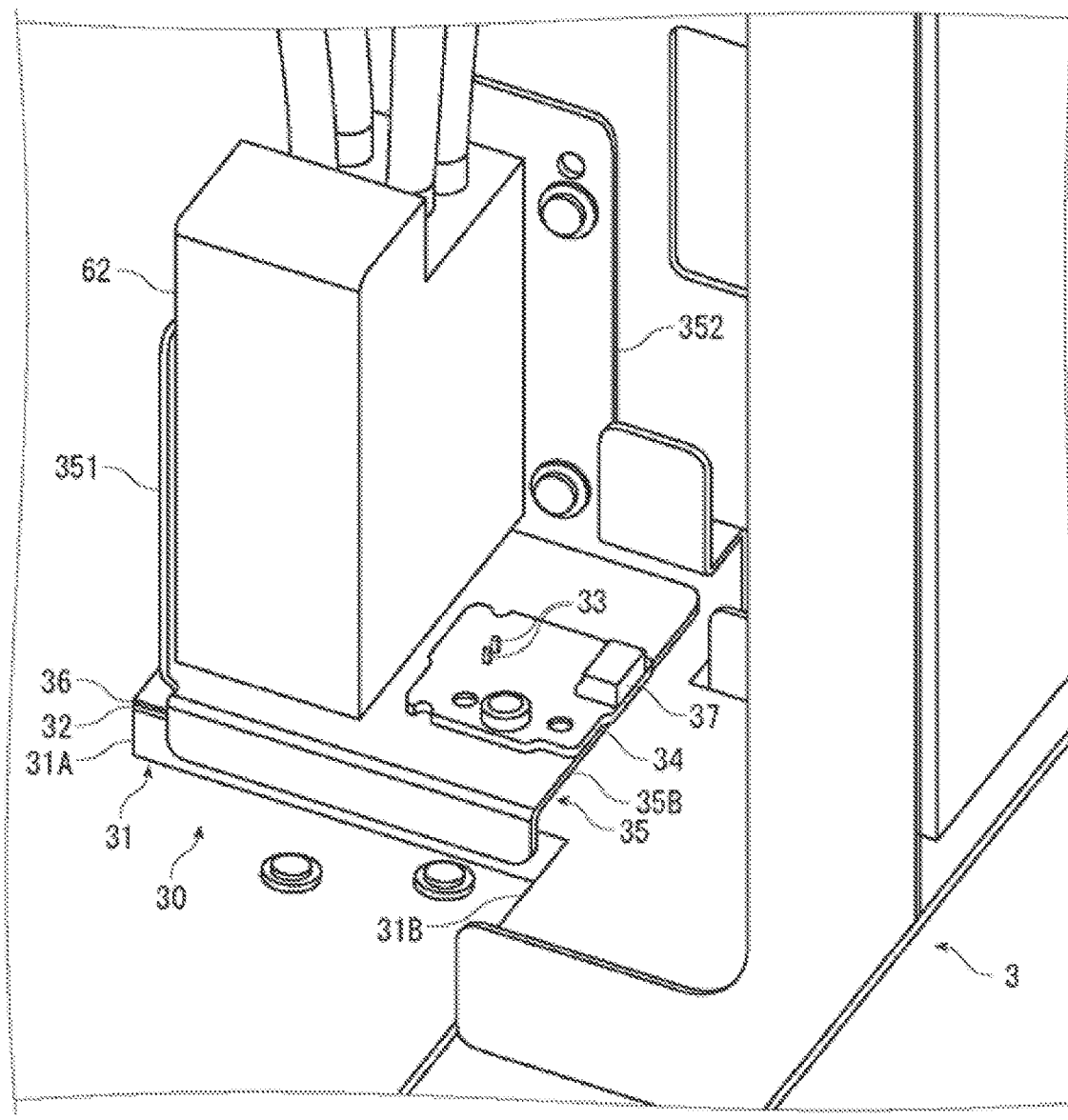
FIG. 4 is a perspective view showing a liquid leakage detection device and a waste liquid pump.
Figure 4:
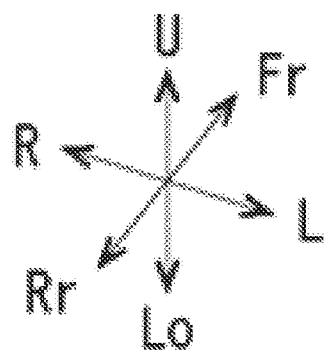
Figure 5:
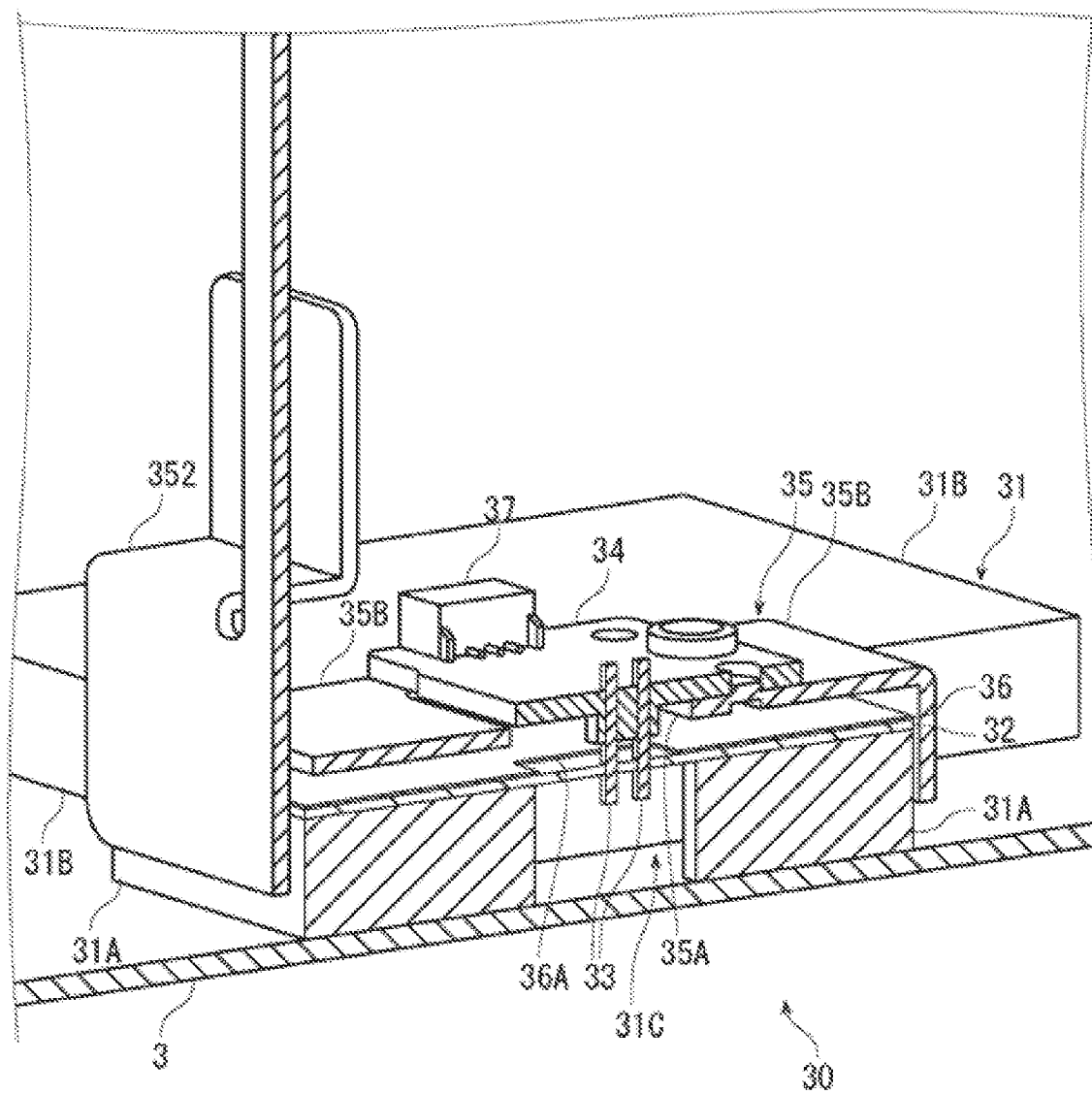
FIG. 5 is a perspective view showing a cross-section of the liquid leakage detection device.
Figure 5:
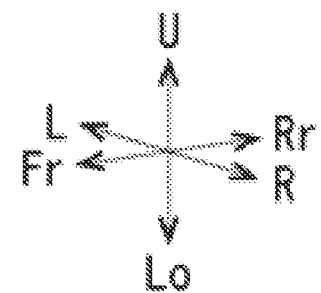
Figure 6:
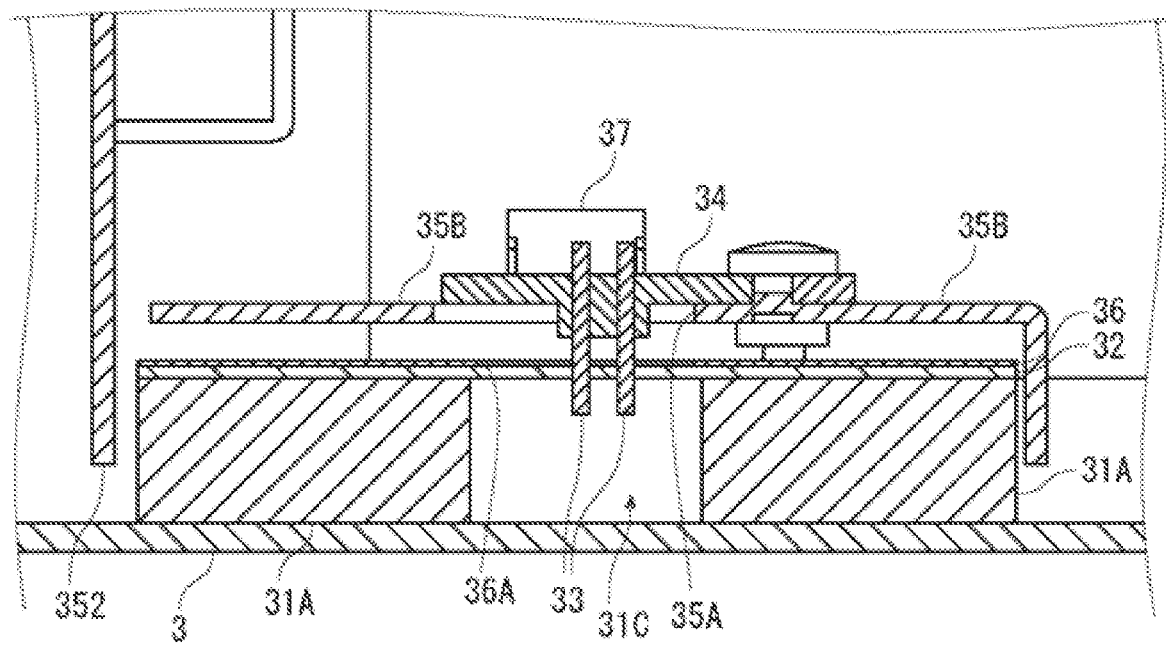
FIG. 6 is a cross-sectional view of the liquid leakage detection device.
Figure 6:
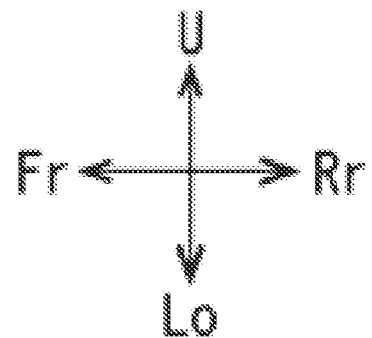
Figure 7:
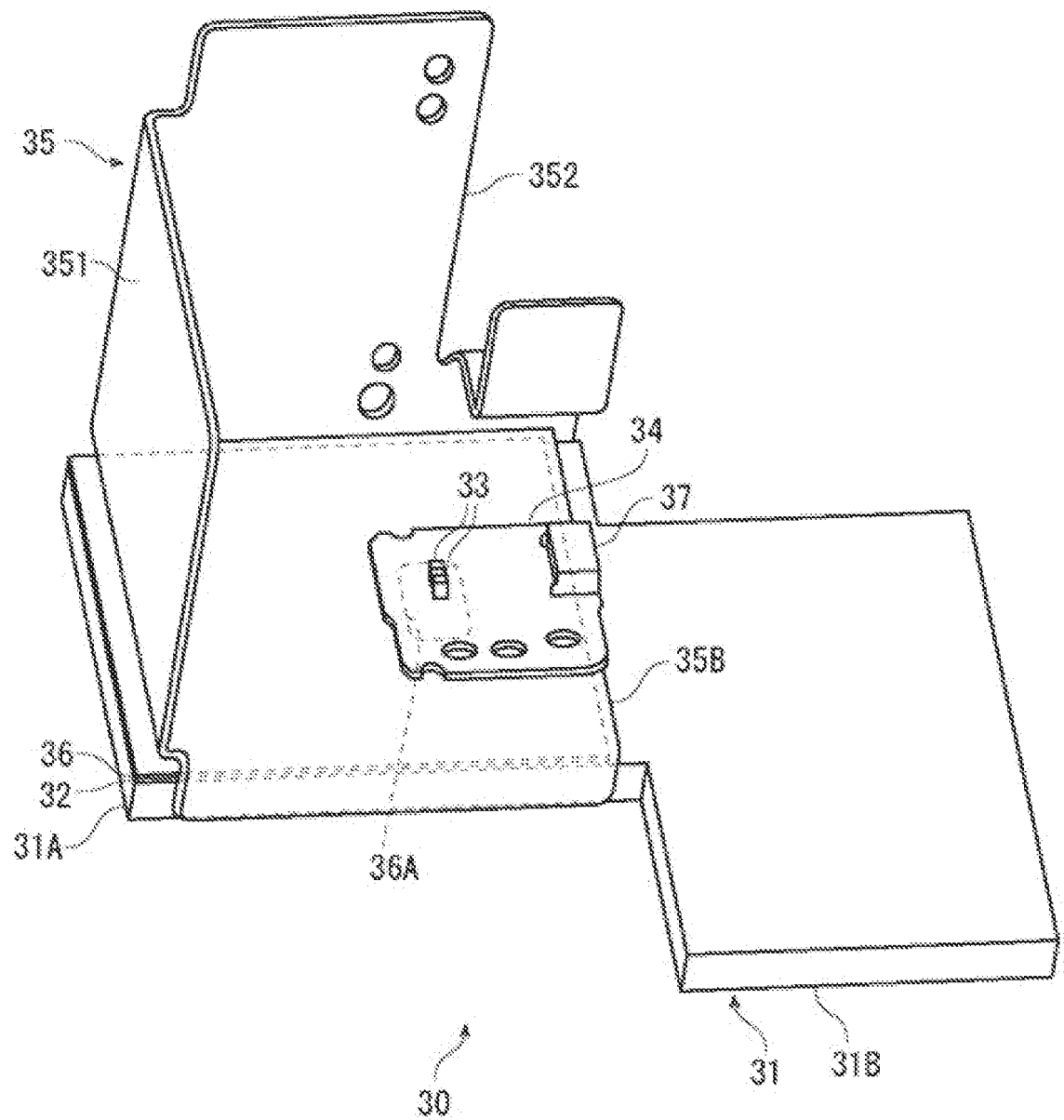
FIG. 7 is a perspective view showing the liquid leakage detection device.
Figure 7:
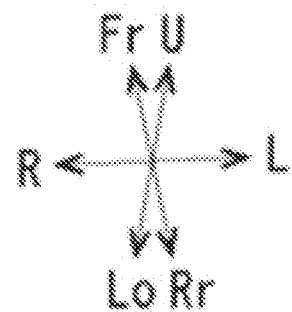
Figure 8:
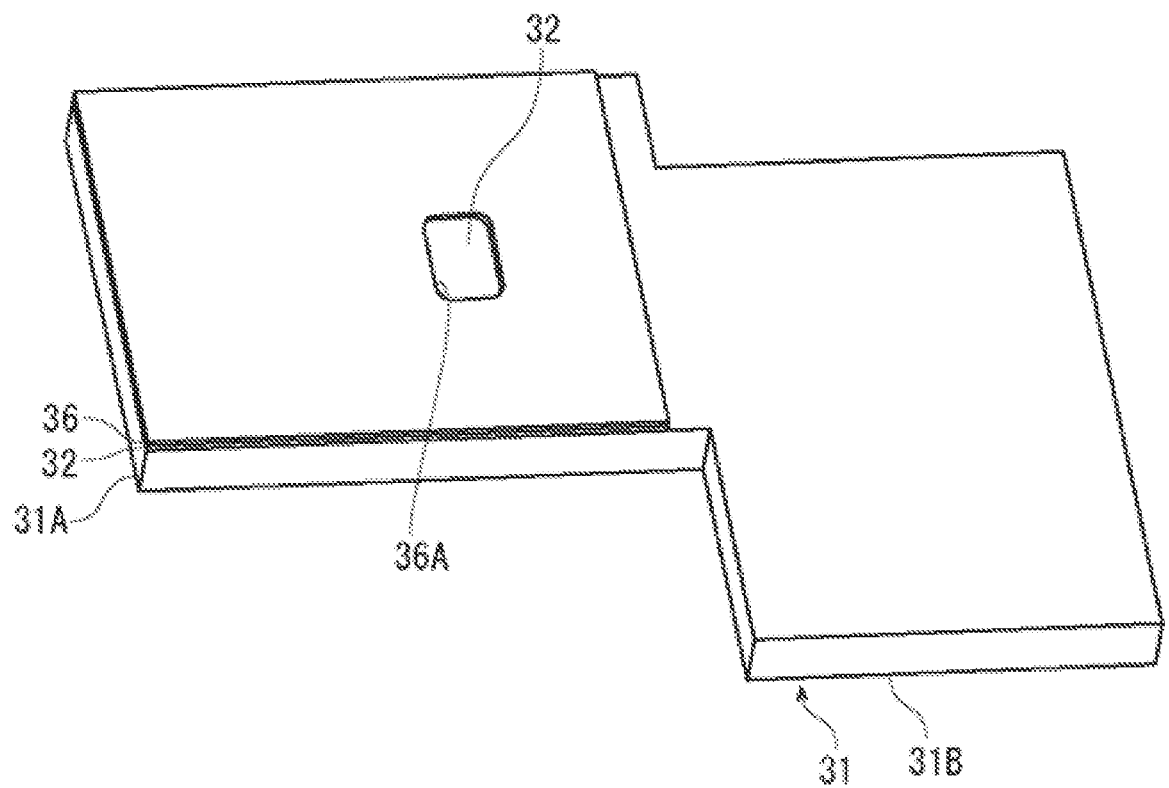
FIG. 8 is a perspective view showing a first absorption layer, a second absorption layer, and an insulation layer.
Figure 8:
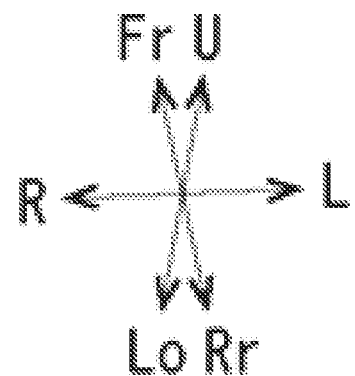
Figure 9:
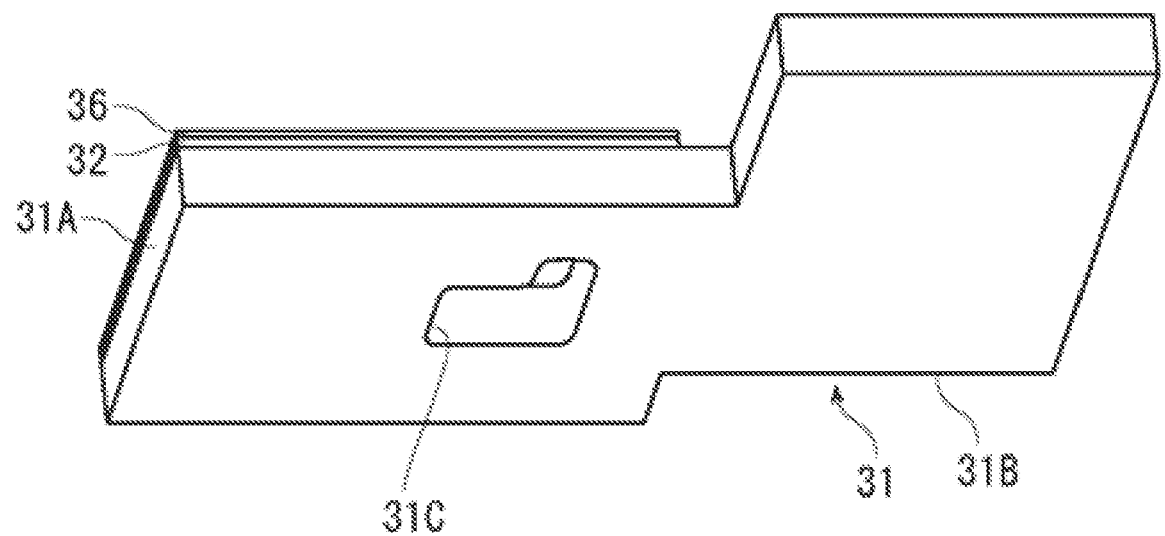
FIG. 9 is another perspective view showing the first absorption layer, the second absorption layer, and the insulation layer.
Figure 9:
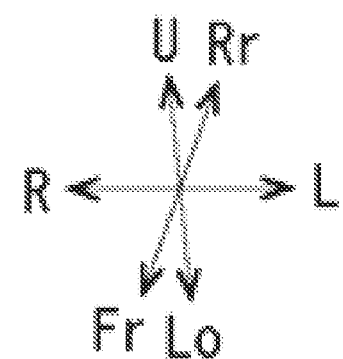

A liquid leakage detection device 30 is located under the waste liquid pump 62, to detect the liquid leakage from the waste liquid pump 62. FIG. 4 is a perspective view showing the liquid leakage detection device 30 and the waste liquid pump 62. FIG. 5 is a perspective view showing a cross-section of the liquid leakage detection device 30. FIG. 6 is a cross-sectional view of the liquid leakage detection device 30. FIG. 7 is a perspective view showing the liquid leakage detection device 30. FIG. 8 and FIG. 9 are perspective views each showing a first absorption layer 31, a second absorption layer 32, and an insulation layer 36.

The liquid leakage detection device 30 includes the first absorption layer 31 that absorbs liquid, the second absorption layer 32 connected to the first absorption layer 31 and capable of absorbing liquid, and a pair of terminals 33 located in contact only with the second absorption layer 32. Stacking the first absorption layer 31 and the second absorption layer 32 on each other results in an increase in amount of liquid that can be absorbed, compared with the case where only the second absorption layer 32 is provided, and also increases the contact resistance of the second absorption layer 32, compared with the case where only the first absorption layer 31 is provided.

[First Absorption Layer and Second Absorption Layer]

The first absorption layer 31 is formed of a felt. Although it suffices that the second absorption layer 32 is formed of a non-woven cloth, substantially the second absorption layer 32 is a thin felt layer. The second absorption layer 32 is thinner than the first absorption layer 31. The second absorption layer 32 is stacked on the upper side of the first absorption layer 31. For example, Himelon (registered trademark) may be employed as the material of the second absorption layer 32. The first absorption layer 31 and the second absorption layer 32 are formed of the same fibrous material. Accordingly, the only substantial difference between the first absorption layer 31 and the second absorption layer 32 is the thickness. However, the second absorption layer 32 may be formed of a material having a higher volume resistance than the first absorption layer 31.

The first absorption layer 31 is laid over the upper surface of the bottom plate of the housing 3, in contact therewith (see FIGS. 4 to 6). The first absorption layer 31 includes an opposing portion 31A, opposed to a bottom portion 35B of a support member 35 to be subsequently described, across the second absorption layer 32 and the insulation layer 36, and a non-opposing portion 31B located on the left of the opposing portion 31A, so as not to oppose the bottom portion 35B of the support member 35 (see FIGS. 4 to 9). A cavity 31C is formed at a position on the left of the center of the opposing portion 31A (see FIG. 9). The cavity 31C is penetrating all the way through in the up-down direction. The cavity 31C is formed in such a size that keeps the pair of terminals 33, to be subsequently described, from contacting the first absorption layer 31. Here, the end portions of the non-opposing portion 31B may be bent upward, to increase the volume of the felt (thus to secure a larger liquid absorption space).

The second absorption layer 32 is stacked on the upper surface of the opposing portion 31A. The upper opening of the cavity 31C in the first absorption layer 31 is covered with the second absorption layer 32. A part of the interface between the second absorption layer 32 and the first absorption layer 31 is bonded with a double-sided adhesive tape or an adhesive. For example, the front end portion and the rear end portion of the interface are bonded. In the bonded region, the upward migration of the liquid due to a capillary effect from the first absorption layer 31 to the second absorption layer 32 is blocked. However, the upward migration of the liquid is not blocked in the non-bonded region. Therefore, it is preferable to make the bonded area smaller, from the viewpoint of detection accuracy.

The insulation layer 36 is stacked on the upper surface of the second absorption layer 32. The insulation layer 36 is, for example, formed of a polyethylene terephthalate (PET) film. The insulation layer 36 includes an opening 36A of the same size as, or slightly smaller than, the cavity 31C in the first absorption layer 31, formed at the position corresponding to the cavity 31C (see FIGS. 5 to 8). The opening 36A is penetrating all the way through in the up-down direction, and the upper surface of the second absorption layer 32 is exposed in the opening 36A.

[Terminal, Substrate, Support Member]

A support member 35 is provided on the upper side of the insulation layer 36 (see FIGS. 4 to 7). The support member 35 includes a bottom portion 35B opposed to the opposing portion 31A of the first absorption layer 31 across the insulation layer 36 and the second absorption layer 32, a first wall portion 351 erected upward from the right end portion of the bottom portion 35B, and a second wall portion 352 extending to the left side from the front end portion of the first wall portion 351. The support member 35 is formed of a metal plate, such as a steel plate. The second wall portion 352 is fixed to the housing 3. The bottom portion 35B is spaced from the insulation layer 36, by a predetermined clearance.

The bottom portion 35B is longer in the left-right direction, than the waste liquid pump 62. The waste liquid pump 62 is located close to the first wall portion 351, and fixed to at least one of the bottom portion 35B and the first wall portion 351. The bottom portion 35B includes an opening 35A of the same size as the cavity 31C of the first absorption layer 31, formed at the position corresponding to the cavity 31C so as to penetrate all the way through in the up-down direction. A substrate 34 is formed on the upper face of the bottom portion 35B, at a position on the left of the waste liquid pump 62. The substrate 34 is larger than the opening 35A of the bottom portion 35B, and substantially covers the entirety of the opening 35A.

The substrate 34 includes the pair of terminals 33 and a sensor 37. The pair of terminals 33 are located at the position corresponding to the opening 35A in the bottom portion of the support member 35, and the opening 36A of the insulation layer 36, and penetrating through the substrate 34 in the up-down direction. The upper ends of the respective terminals 33 are sticking out from the upper face of the substrate 34. The lower ends of the respective terminals 33 are sticking out from the lower face of the substrate 34, and penetrating through the second absorption layer 32. The pair of terminals 33 are in contact only with the second absorption layer 32, and not in contact with any of the support member 35, the insulation layer 36, the first absorption layer 31, and the bottom portion of the housing 3.

The sensor 37 is connected to the pair of terminals 33, to detect a decline in contact resistance between the pair of terminals 33 and the second absorption layer 32. When the liquid is not absorbed by the second absorption layer 32, the contact resistance is higher than a predetermined threshold, and when the liquid is absorbed by the second absorption layer 32, the contact resistance becomes lower than the predetermined threshold. When the waste liquid leaks, for example from the waste liquid pump 62, the waste liquid that has leaked drops on the bottom portion of the housing 3 and is absorbed by the first absorption layer 31. The waste liquid then migrates upward owing to a capillary effect, and permeates the second absorption layer 32. The volume resistance of the second absorption layer 32 declines owing to the waste liquid that has permeated, and resultantly the contact resistance between the second absorption layer 32 and the terminal 33 declines to a level below the threshold. When the contact resistance declines to the level below the threshold, the sensor 37 outputs a detection signal indicating that liquid leakage has been detected, to the control device 2.

FIG. 10 is a graph showing experimental results of the contact resistance. The horizontal axis represents temperature and humidity (relative humidity). The vertical axis represents the contact resistance. The temperature and humidity were varied in five levels, namely 22° C. and 60%, 28° C. and 80%, 32° C. and 85%, 40° C. and 90%, and 55° C. and 90%. In the comparative example, the second absorption layer 32 is not provided, and the pair of terminals 33 are in contact with the first absorption layer 31. In the comparative example, the contact resistance between the terminal 33 and the first absorption layer 31 was measured, and in the working example, the contact resistance between the terminal 33 and the second absorption layer 32 was measured.

As result of the experiment with the comparative example, while the contact resistance was higher than 100 MΩ in the humidity of 60%, the contact resistance sharply dropped to approximately 15 MΩ, when the humidity exceeded 80%. With the working example, in contrast, the contact resistance exceeded 100 MΩ in the humidity of 80%, and was approximately 65MΩ even in the humidity of 85%. Thus, a significant improvement was achieved, compared with the comparative example.

Now, with the aforementioned known technique, a terminal is set in contact with an absorbing body for absorbing liquid, and the liquid leakage is detected by sensing a decline in contact resistance between the terminal and the absorbing body, which takes place when the liquid that has leaked is absorbed by the absorbing body. To prevent misdetection in such a technique, the contact resistance in the state where the liquid is not absorbed by the absorbing body has to be set to a high value. To increase the contact resistance, an absorbing body formed of a material having a high volume resistance may be employed, or an absorbing body of a reduced thickness may be employed. However, when such an absorbing body is employed, the amount of the liquid that can be absorbed is reduced, and therefore the liquid may leak around the absorbing body. In contrast, when the absorbing body is made thicker to increase the amount of the liquid that can be absorbed, the moisture in the ambient air is absorbed by the absorbing body in a high-humidity environment, and the volume resistance declines, which also leads to a decline in contact resistance. Therefore, the risk of misdetection is increased.

In contrast, the liquid leakage detection device 30 according to this embodiment includes the first absorption layer 31 that absorbs liquid, the second absorption layer 32 stacked on the first absorption layer 31 and capable of absorbing liquid, and the pair of terminals 33 located in contact only with the second absorption layer 32. Since the first absorption layer 31 and the second absorption layer 32 are stacked on each other as described above, a larger amount of liquid can be absorbed, compared with the case where only the second absorption layer 32 is provided (i.e., when the first absorption layer 31 is not provided), and the contact resistance of the second absorption layer 32 becomes higher, compared with the case where only the first absorption layer 31 is provided (i.e., when the pair of terminals 33 are in contact with the first absorption layer 31). Therefore, misdetection under a high-humidity environment can be prevented.

In the liquid leakage detection device 30 according to this embodiment, the first absorption layer 31 can absorb a larger amount of liquid than the second absorption layer 32, and the second absorption layer 32 has a higher contact resistance than the first absorption layer 31. Accordingly, the amount of the liquid that can be absorbed is surely increased, compared with the case where the first absorption layer 31 is not provided. In addition, the misdetection under a high-humidity environment can be assuredly prevented, compared with the case where the pair of terminals 33 are set in contact with the first absorption layer 31.

In the liquid leakage detection device 30 according to this embodiment, the volume resistance of the second absorption layer 32 is higher than that of the first absorption layer 31. Therefore, the contact resistance of the second absorption layer 32 becomes higher than that of the first absorption layer 31.

In the liquid leakage detection device 30 according to this embodiment, the second absorption layer 32 is thinner than the first absorption layer 31. Therefore, the contact resistance of the second absorption layer 32 can be made higher than that of the first absorption layer 31. In addition, the first absorption layer 31 an absorb a larger amount of liquid, than the second absorption layer 32.

In the liquid leakage detection device 30 according to this embodiment, the first absorption layer 31 includes the cavity 31C in the interface with the second absorption layer 32, and the pair of terminals 33 are penetrating through the second absorption layer 32 at the position corresponding to the cavity 31C. Therefore, the terminals 33 can be assuredly made to contact the second absorption layer 32, and be prevented from contacting the first absorption layer 31.

In the liquid leakage detection device 30 according to this embodiment, further, a part of the interface between the first absorption layer 31 and the second absorption layer 32 is not bonded. Therefore, the upward migration of the liquid from the first absorption layer 31 to the second absorption layer 32 can be exempted from being blocked.

The liquid leakage detection device 30 according to this embodiment further includes the substrate 34 supporting the pair of terminals 33, the support member 35 made of a metal plate and supporting the substrate 34, and the insulation layer 36 provided between the support member 35 and the second absorption layer 32. Therefore, misdetection caused by a current leaking through the support member 35 can be prevented. In addition, manufacturing of a die for forming the support member 35 from a resin is not required, which contributes to reducing the cost in the case of a small-lot production. Here, although the insulation layer 36 is effective in this embodiment because metal is employed for many of the components, the insulation layer 36 may be excluded when resin is predominantly employed.

The foregoing embodiment may be modified as follows.

Although felt is employed as the material of the first absorption layer 31 in the foregoing embodiment, for example sponge or the like may be employed for the first absorption layer 31.

In the foregoing embodiment, the second absorption layer 32 is given a higher contact resistance than that of the first absorption layer 31, by making the second absorption layer 32 thinner than the first absorption layer 31. However, a material having a higher volume resistance than the first absorption layer 31 may be employed for the second absorption layer 32. With such a configuration also, the contact resistance of the second absorption layer 32 can be made higher than that of the first absorption layer 31.

Although the cavity 31C is penetrating through the first absorption layer 31 in the up-down direction in the foregoing embodiment, it suffices that the cavity 31C has a size that keeps the pair of terminals 33 from contacting the first absorption layer 31, and it is not mandatory that the cavity 31C penetrates all the way through the first absorption layer 31.

In the foregoing embodiment, the first absorption layer 31 includes the cavity 31C in the interface with the second absorption layer 32, and the pair of terminals 33 are penetrating through the second absorption layer 32 at the position corresponding to the cavity 31C. However, it is not mandatory that the pair of terminals 33 penetrate through the second absorption layer 32. In this case, the first absorption layer 31 may be without the cavity 31C.

Although a part of the interface between the first absorption layer 31 and the second absorption layer 32 is not bonded in the foregoing embodiment, the entirety of the interface may remain unbonded.

Although the first absorption layer 31 and the second absorption layer 32 are bonded to each other in the foregoing embodiment, the first absorption layer 31 and the second absorption layer 32 may be combined by a method other than bonding. For example, a needle punch method may be employed, to entangle the fiber of the first absorption layer 31 and the second absorption layer 32, thereby unifying these layers.

Although the support member 35 is formed of a metal plate in the foregoing embodiment, the support member 35 may be formed of a resin. In this case, the insulation layer 36 may be excluded. In addition, the support member 35 can be formed through an injection molding process, which leads to a reduction in cost in the case of mass production.

Although the insulation layer 36 is stacked on the upper surface of the second absorption layer 32 in the foregoing embodiment, the insulation layer 36 may be provided on the lower surface of the bottom portion 35B of the support member 35.

In addition to the configuration according to the foregoing embodiment, the insulation layer 36 may be provided on the lower surface of the first absorption layer 31.

While the present disclosure has been described in detail with reference to the embodiments thereof, it would be apparent to those skilled in the art the various changes and modifications may be made therein within the scope defined by the appended claims.

What is claimed is:

1. A liquid leakage detection device comprising:
   a first absorption layer that absorbs liquid;
   a second absorption layer that absorbs the liquid, the second absorption layer being stacked on the first absorption layer; and
   a pair of terminals in contact only with the second absorption layer.

2. The liquid leakage detection device according to claim 1,
   wherein the first absorption layer can absorb a larger amount of the liquid than the second absorption layer, and
   the second absorption layer has higher contact resistance than the first absorption layer.

3. The liquid leakage detection device according to claim 1,
   wherein the second absorption layer has higher volume resistance than the first absorption layer.

4. The liquid leakage detection device according to claim 1,
   wherein the second absorption layer is thinner than the first absorption layer.

5. The liquid leakage detection device according to claim 1,
   wherein the first absorption layer includes a cavity formed in an interface with the second absorption layer, and
   the pair of terminals are penetrating through the second absorption layer at a position corresponding to the cavity.

6. The liquid leakage detection device according to claim 1,
   wherein a part or whole of an interface between the first absorption layer and the second absorption layer is unbonded.

7. The liquid leakage detection device according to claim 1, further comprising:
   a substrate supporting the pair of terminals;
   a support member formed of a metal plate, and supporting the substrate; and
   an insulation layer provided between the support member and the second absorption layer.

8. The liquid leakage detection device according to claim 1, further comprising:
   a substrate supporting the pair of terminals; and
   a support member formed of a resin, and supporting the substrate.

9. An ink jet recording apparatus comprising:
   the liquid leakage detection device according to claim 1; and
   an ink jet head that ejects ink onto a sheet.

10. The ink jet recording apparatus according to claim 9, further comprising a housing including therein the ink jet head,
   wherein the first absorption layer of the liquid leakage detection device is located in contact with an upper face of a bottom plate of the housing.

* * * * *